(12) United States Patent
Shen et al.

(10) Patent No.: US 11,818,519 B2
(45) Date of Patent: Nov. 14, 2023

(54) METHOD AND SYSTEM OF OSNR-SENSING SPECTRUM ALLOCATION WITH OPTICAL CHANNEL PERFORMANCE GUARANTEE

(71) Applicant: SOOCHOW UNIVERSITY, Suzhou (CN)

(72) Inventors: Gangxiang Shen, Suzhou (CN); Ningning Guo, Suzhou (CN); Yongcheng Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 61 days.

(21) Appl. No.: 17/771,462

(22) PCT Filed: Apr. 20, 2021

(86) PCT No.: PCT/CN2021/088324
§ 371 (c)(1),
(2) Date: Apr. 23, 2022

(87) PCT Pub. No.: WO2022/198735
PCT Pub. Date: Sep. 29, 2022

(65) Prior Publication Data
US 2023/0319443 A1 Oct. 5, 2023

(30) Foreign Application Priority Data

Mar. 26, 2021 (CN) .......................... 202110326085.2

(51) Int. Cl.
*H04Q 11/00* (2006.01)
*H04B 10/079* (2013.01)

(52) U.S. Cl.
CPC ... *H04Q 11/0062* (2013.01); *H04B 10/07953* (2013.01); *H04Q 2011/0073* (2013.01);
(Continued)

(58) Field of Classification Search
CPC ......... H04B 10/07953; H04Q 11/0062; H04Q 2011/0073; H04Q 2011/0084; H04Q 2011/0086
(Continued)

(56) References Cited

U.S. PATENT DOCUMENTS 10,348,439 B1 * 7/2019 Kim .................... H04L 41/0895
2014/0193148 A1 * 7/2014 Dahlfort ............... H04B 10/073
398/34
(Continued)

FOREIGN PATENT DOCUMENTS

CN 103765803 A 4/2014
CN 104272610 A 1/2015
(Continued)

*Primary Examiner* — Dalzid E Singh
(74) *Attorney, Agent, or Firm* — SZDC LAW P.C.

(57) ABSTRACT

The present invention provides a method and system of OSNR-sensing spectrum allocation with optical channel performance guarantee. The method includes constructing an OSNR evaluation model; acquiring the shortest path between a source node and a destination node; acquiring a plurality of modulation formats and corresponding thresholds, sorting the plurality of modulation formats in descending order, and acquiring a list of the sorted modulation formats; calculating the bandwidth required by the lightpath service based on the bandwidth demand and FEC overhead by using the modulation format with the highest spectrum efficiency; substituting the bandwidth required by the lightpath service into the OSNR evaluation model and obtaining the number of FS actually required by the service; and allocating the spectrum resource required by the current service to the shortest path by using a first-fit algorithm and obtaining the center frequency of the current service on the lightpath.

10 Claims, 4 Drawing Sheets

(52) U.S. Cl.
CPC ............... *H04Q 2011/0084* (2013.01); *H04Q 2011/0086* (2013.01)

(58) Field of Classification Search
USPC .......................................... 398/26
See application file for complete search history.

(56) References Cited

U.S. PATENT DOCUMENTS

| | | | |
|---|---|---|---|
| 2015/0162980 A1* | 6/2015 | Cavaliere | H04J 14/02 398/26 |
| 2016/0105252 A1* | 4/2016 | Bouda | H04J 14/0257 398/49 |
| 2017/0346594 A1 | 11/2017 | Vassilieva et al. | |
| 2019/0097720 A1* | 3/2019 | Kim | H04J 14/0227 |

FOREIGN PATENT DOCUMENTS

| | | |
|---|---|---|
| CN | 105721130 A | 6/2016 |
| CN | 108199881 A | 6/2018 |
| WO | 2020040011 A1 | 2/2020 |

\* cited by examiner (a) NSFNET (b) USNET

METHOD AND SYSTEM OF OSNR-SENSING SPECTRUM ALLOCATION WITH OPTICAL CHANNEL PERFORMANCE GUARANTEE

This application is the National Stage Application of PCT/CN2021/088324, filed on Apr. 20, 2021, which claims priority to Chinese Patent Application No. 202110326085.2, filed on Mar. 26, 2021, which is incorporated by reference for all purposes as if fully set forth herein.

FIELD OF THE INVENTION

The present invention relates to the technical field of optical communication, and more particularly to a method and system of OSNR-sensing spectrum allocation with optical channel performance guarantee.

DESCRIPTION OF THE RELATED ART

For an optical transmission system, characteristics such as low loss and large effective area of the optical fiber contribute to improvement in performance. However, from the perspective of optical fiber manufactures, it is very challenging and costly to fabricate an optical fiber with a low attenuation coefficient and a large effective area. As disclosed in the document "Spectrum efficiency and cost evaluation for G.654.E fiber . . . ," N. Guo et al., in Proc. ACP 2020, paper M4A.274, the spectrum efficiency increases slowly as the attenuation coefficient of the optical fiber decreases, and increases rapidly as the effective area of the optical fiber increases from 83 $\mu m^2$ to 130 $\mu m^2$ in a point-to-point optical transmission system.

However, in real life, the optical fiber provides lightpath service to the network. Therefore, considering a complete network topology, the result from a point-to-point system cannot accurately reflect the advantages for optical signal transmission in the network introduced by an optical fiber with low loss and large effective area, and the traditional optical signal-to-noise ratio evaluation model is no longer accurate.

SUMMARY OF THE INVENTION

In view of this, the present invention aims to solve the technical problem in the prior art that for a complete network topology, the result from a point-to-point system cannot accurately reflect the advantages for optical signal transmission in the network introduced by an optical fiber with low loss and large effective area, and the traditional optical signal-to-noise ratio evaluation model is no longer accurate.

To solve the above technical problem, the present invention provides a method of OSNR-sensing spectrum allocation with optical channel performance guarantee, including the following steps:

S1: constructing an OSNR evaluation model to evaluate signal transmission quality of the lightpath, the OSNR evaluation model including amplified spontaneous emission noise, nonlinear interference and filter narrowing effect due to ROADM cascading;

S2: sending a lightpath service request and acquiring the shortest path between the source node and the destination node;

S3: acquiring a plurality of modulation formats and corresponding thresholds, sorting the plurality of modulation formats according to their spectrum efficiencies in descending order, and obtaining a list of the sorted modulation formats;

S4: calculating the bandwidth required by the lightpath service based on the bandwidth demand and FEC overhead by using the modulation format with the highest spectrum efficiency;

S5: substituting the bandwidth required by the lightpath service into the OSNR evaluation model and obtaining the number of FS actually required by the service; and S6: allocating the spectrum resource required by the current service to the shortest path by using the first-fit algorithm and obtaining the center frequency of the current service on the lightpath.

Preferably, the method includes, after step of allocating the spectrum resource required by the current service to the shortest path by using the first-fit algorithm and obtaining the center frequency of the current service on the lightpath:

evaluating the OSNR quality by using a full-spectrum loading strategy, a margin reservation strategy and a spectrum-dependent strategy respectively to guarantee the optimum optical channel performance after spectrum allocation.

Preferably, evaluating the OSNR quality by using the full-spectrum loading strategy includes:

evaluating the transmission quality (i.e., OSNR) of the lightpath when all the spectrum resources on the link are occupied and the OSNR performance is the worst;

if OSNR satisfies the threshold for the current modulation format, establishing a lightpath and ending the allocation process, otherwise, calculating the bandwidth required by the lightpath service based on the bandwidth demand and the FEC overhead by using the modulation format subsequent to the current modulation format in the modulation format list, and repeating S5 and the steps thereafter until the lightpath service request is established; and after all the lightpath service requests have been successfully established, checking all the lightpath service requests in consideration of the nonlinear interference, recalculating the OSNR and determining whether it still satisfies the selected modulation format, and if it does not satisfy the current modulation format, blocking this service.

Preferably, evaluating the OSNR quality by using the margin reservation strategy includes:

calculating the transmission quality OSNR of the lightpath based on the center frequency of the current spectrum resource on the fiber link;

reserving a margin M;

if (OSNR−M) satisfies the threshold for the current modulation format, establishing a lightpath and ending the allocation process, otherwise, calculating the bandwidth required by the lightpath service based on the bandwidth demand and the FEC overhead by using the modulation format subsequent to the current modulation format in the modulation format list, and repeating S5 and the steps thereafter until the lightpath service request is established; and after all the lightpath service requests have been successfully established, checking all the lightpath service requests in consideration of the nonlinear interference, recalculating the OSNR and determining whether it still satisfies the selected modulation format, and if it does not satisfy the current modulation format, blocking this service.

Preferably, evaluating the OSNR quality by using the spectrum-dependent strategy includes:

calculating the transmission quality OSNR of the lightpath based on the center frequency of the current spectrum resource on the fiber link;

if the OSNR satisfies the threshold for the current modulation format, establishing a lightpath and ending the allocation process, otherwise, calculating the bandwidth required by the lightpath service based on the bandwidth demand and the FEC overhead by using the modulation format subsequent to the current modulation format in the modulation format list, and repeating S5 and the steps thereafter until the lightpath service request is established; and after all the lightpath service requests have been successfully established, checking all the lightpath service requests in consideration of the nonlinear interference, recalculating the OSNR and determining whether it still satisfies the current modulation format;

if the OSNR does not satisfy the current modulation format, releasing the spectrum resource used by all the lightpaths that have not been checked starting from the failed lightpath; and for the failed service request, lowering the level of the modulation format used and reallocating the spectrum along the same shortest path.

Preferably, the method further includes, after the step of, for the failed service request, lowering the level of the modulation format used and reallocating the spectrum along the same shortest path:

for a lightpath that has not been checked, reallocating the spectrum by using the modulation format that has been previously used and checking whether this lightpath satisfies the signal-to-noise ratio requirement; and repeating the process above until all the new lightpaths have been successfully established and all the lightpaths satisfy the signal-to-noise ratio requirement.

Preferably, the step S1 includes:

when the signal bandwidth is $BW_s$, the 3 dB bandwidth of the filter is:

$$BW_{3dB} = BW_s \times \left[\frac{T[dB]}{10 \times (-\ln 2) \times \log_{10}(e) \times N_f}\right]^{-\frac{1}{2n}}, \quad (1)$$

where T is the insertion loss of the filter in the unit of dB, $N_f$ is the number of cascaded filters, and n is the order of Gaussian function;

the overall signal-to-noise ratio of the lightpath $OSNR_{lightpath}$ is:

$$OSNR_{lightpath} = \frac{P_{in}}{P_{ASE} + P_{NLI}}, \quad (2)$$

where $P_{in}$ is the transmit power of the lightpath, $P_{ASE}$ is the power of the ASE noise, and $P_{NLI}$ is the power of NLI interference;

in the case where each optical amplifier can exactly compensate for the loss of the previous signal, $P_{ASE}$ is calculated by the formula:

$$P_{ASE} = F \times h \times (G-1) \times f_i \times B_i \quad (3)$$

where F is the noise figure of the optical amplifier, h is the Planck constant, G is the gain of the optical amplifier, $f_i$ is the center frequency of the signal, and $B_i$ is the bandwidth of the signal;

for the nonlinear interference and assuming additive Gaussian noise, $P_{NLI}$ can be calculated as:

$$P_{NLI} = \eta \times P_{ch}^3 = \quad (4)$$

-continued $$P_{ch}^3 \times \frac{4}{27} \times \frac{Y^2 L_{eff}^2 B_1}{\pi(\alpha)^{-1} \beta_2 R_S^3} \sum_{n=1}^{N_{ch}} \left\{ asinh\left[\pi^2(\alpha)^{-1}\beta_2 B_i\left(f_n - f_i + \frac{B_n}{2}\right)\right] - asinh\left[\pi^2(\alpha)^{-1}\beta_2 B_i\left(f_n - f_i - \frac{B_n}{2}\right)\right]\right\}$$

where $L_{eff} = (1 - e^{-\alpha \cdot L_{span}})/\alpha$, $Y = 2\pi \times n_2/(\lambda \times A_{eff})$, "asinh" is the inverse hyperbolic sine function, $\alpha$ is the attenuation coefficient of the optical fiber, $\beta_2$ is the second order fiber dispersion coefficient, $L_{span}$ is the span length, span meaning the physical link between two adjacent optical amplifiers, $\lambda$ is the wavelength of the signal, $n_2$ is the nonlinear refractive index of the optical fiber, and $A_{eff}$ is the effective area of the optical fiber.

Preferably, the plurality of modulation formats in the step S3 includes: PM-64QAM, PM-32QAM, PM-16QAM, PM-8QAM, PM-QPSK and PM-BPSK.

The present invention discloses a system of OSNR-sensing spectrum allocation with optical channel performance guarantee, including:

an OSNR construction module configured to construct an OSNR evaluation model to evaluate the signal transmission quality of the lightpath, the OSNR evaluation model including amplified spontaneous emission noise, nonlinear interference and filter narrowing effect due to ROADM cascading;

a shortest-path acquisition module configured to send a lightpath service request and acquire the shortest path between the source node and the destination node;

a modulation format sorting module configured to acquire a plurality of modulation formats and corresponding thresholds, sort the plurality of modulation formats according to their spectrum efficiencies in descending order, and acquire a list of the sorted modulation formats; and a spectrum allocation module configured to calculate the bandwidth required by the lightpath service based on the bandwidth demand and FEC overhead by using the modulation format with the highest spectrum efficiency; substitute the bandwidth required by the lightpath service into the OSNR evaluation model and obtain the number of FS actually required by the service; and allocate the spectrum resource required by the current service to the shortest path by using the first-fit algorithm and acquire the center frequency of the current service on the lightpath.

Preferably, the system further includes:

an OSNR quality evaluation module configured to evaluate the OSNR quality by using a full-spectrum loading strategy, a margin reservation strategy and a spectrum-dependent strategy respectively to guarantee the optimum optical channel performance after spectrum allocation.

Compared with prior art, the technical solution of the present invention has the following advantages.

1. The present invention proposes a complete lightpath signal-to-noise Ratio (OSNR) evaluation model on the basis of the traditional Gaussian Noise (GN) model in consideration of the cascading effect of the Reconfigurable Optical Add-Drop Multiplexer (ROADM).

2. The present invention proposes three spectrum allocation solutions in consideration of the Cross Channel Interference (XCI) between the lightpath previously established and the lightpath currently to be established. Simulation results show that the spectrum-dependent strategy proposed is the most effective, since spectrum allocation according to this strategy considers the current XCI value for each of the lightpaths.

3. According to the present invention, in contrast to the traditional concept, it is found that although reducing the optical fiber loss always contributes to increased spectrum efficiency, further increase in the effective area can no longer substantially increase the spectrum efficiency once the effective area is over 110 μm². This fact is very important for guidance in using optical fibers with low loss and large effective area in EON.

DETAILED DESCRIPTION OF THE PREFERRED EMBODIMENTS

The present invention will be further explained with reference to the drawings and particular embodiments below to enable those skilled in the art to better understand and implement the present invention, but the embodiments listed are not intended as limitations of the present invention.

Figure 1:
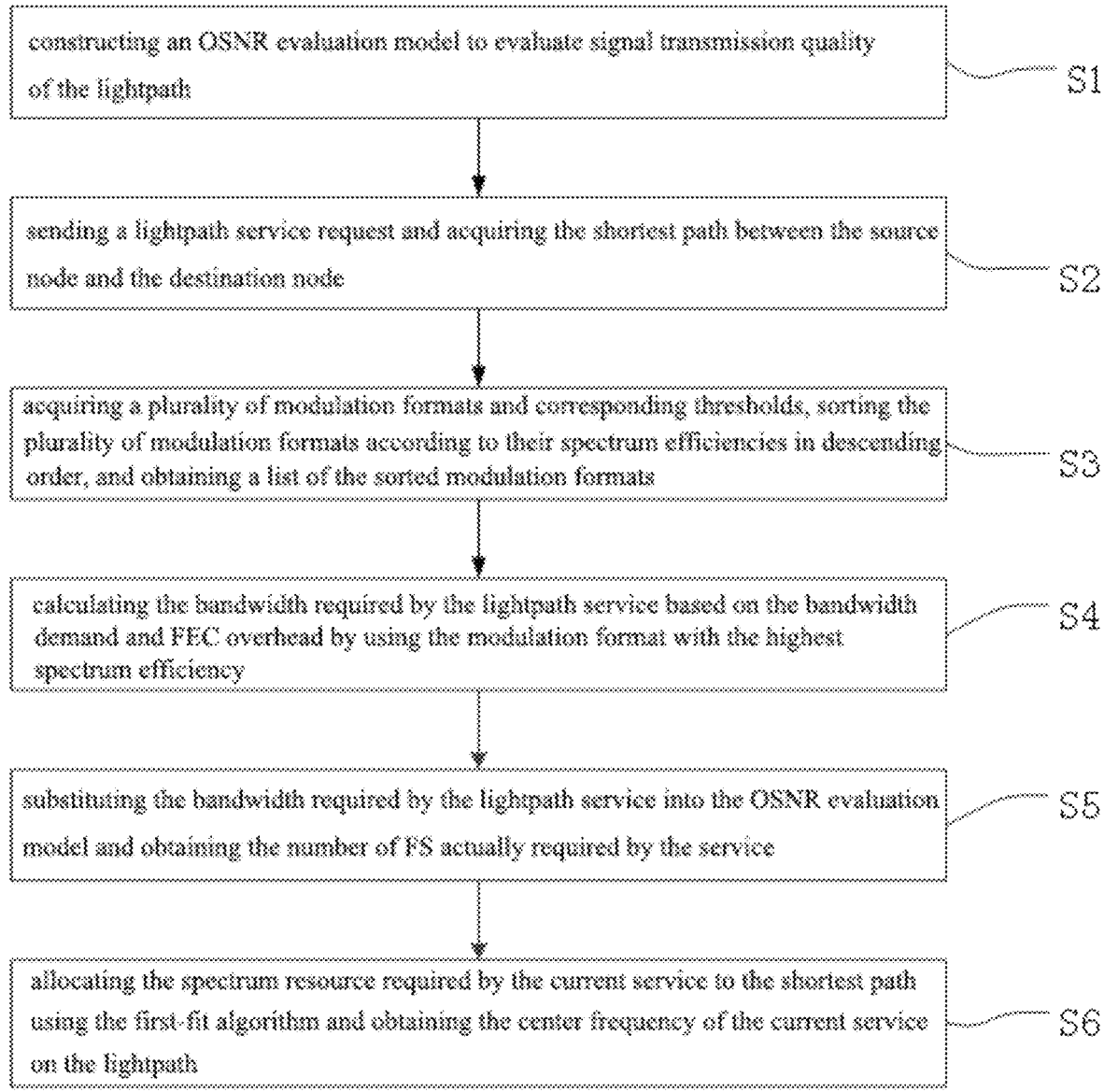
FIG. 1 shows a method of OSNR-sensing spectrum allocation with optical channel performance guarantee.

Referring to FIG. 1, the present invention discloses a method of OSNR-sensing spectrum allocation with optical channel performance guarantee including the following steps.

Step 1: constructing an OSNR evaluation model to evaluate signal transmission quality of the lightpath, the OSNR evaluation model including amplified spontaneous emission noise, nonlinear interference and filter narrowing effect due to ROADM cascading, specifically including:

when the signal bandwidth is $BW_s$, the 3 dB bandwidth of the filter is:

$$BW_{3dB} = BW_s \times \left[\frac{T[dB]}{10 \times (-\ln 2) \times \log_{10}(e) \times N_f}\right]^{-\frac{1}{2n}}, \quad (1)$$

where T is the insertion loss of the filter in the unit of dB, $N_f$ is the number of cascaded filters, and n is the order of Gaussian function;

the overall signal-to-noise ratio of the lightpath $OSNR_{lightpath}$ is:

$$OSNR_{lightpath} = \frac{P_{in}}{P_{ASE} + P_{NLI}}, \quad (2)$$

where $P_{in}$ is the transmit power of the lightpath, $P_{ASE}$ is the power of the ASE noise, and $P_{NLI}$ is the power of NLI interference;

in the case where each optical amplifier can exactly compensate for the loss of the previous signal, $P_{ASE}$ is calculated by the formula:

$$P_{ASE} = F \times h \times (G-1) \times f_i \times B_i \quad (3)$$

where F is the noise figure of the optical amplifier, h is the Planck constant, G is the gain of the optical amplifier, $f_i$ is the center frequency of the signal, and $B_i$ is the bandwidth of the signal;

for the nonlinear interference and assuming additive Gaussian noise, $P_{NLI}$ can be calculated as:

$$P_{NLI} = \eta \times P_{ch}^3 = \qquad (4)$$
$$P_{ch}^3 \times \frac{4}{27} \times \frac{Y^2 L_{eff}^2 B_1}{\pi(\alpha)^{-1} \beta_2 R_S^3} \sum_{n=1}^{N_{ch}} \left\{ asinh\left[\pi^2(\alpha)^{-1}\beta_2 B_i\left(f_n - f_i + \frac{B_n}{2}\right)\right] - asinh\left[\pi^2(\alpha)^{-1}\beta_2 B_i\left(f_n - f_i - \frac{B_n}{2}\right)\right]\right\}$$

where $L_{eff} = (1 - e^{-\alpha \cdot L_{span}})/\alpha$, $Y = 2\pi \times n_2/(\lambda \times A_{eff})$, "asinh" is the inverse hyperbolic sine function, $\alpha$ is the attenuation coefficient of the optical fiber, $\beta_2$ is the second order fiber dispersion coefficient, $L_{span}$ is the span length, span meaning the physical link between two adjacent optical amplifiers, $\lambda$ is the wavelength of the signal, $n_2$ is the nonlinear refractive index of the optical fiber, and $A_{eff}$ is the effective area of the optical fiber.

Step 2: sending a lightpath service request and acquiring the shortest path between the source node and the destination node.

Step 3: acquiring a plurality of modulation formats and corresponding thresholds, sorting the plurality of modulation formats according to their spectrum efficiencies in descending order, and acquiring a list of the sorted modulation formats. The plurality of modulation formats in the step 3 includes PM-64QAM, PM-32QAM, PM-16QAM, PM-8QAM, PM-QPSK and PM-BPSK.

Step 4: calculating the bandwidth required by the lightpath service based on the bandwidth demand and FEC overhead by using the modulation format with the highest spectrum efficiency.

Step 5: substituting the bandwidth required by the lightpath service into the OSNR evaluation model and obtaining the number of FS actually required by the service.

Step 6: allocating the spectrum resource required by the current service to the shortest path by using the first-fit algorithm, and obtaining the center frequency of the current service on the lightpath.

Step 7: evaluating the OSNR quality by using a full-spectrum loading strategy, a margin reservation strategy and a spectrum-dependent strategy respectively to guarantee the optimum optical channel performance after spectrum allocation.

(1) Evaluating the OSNR quality by using the full-spectrum loading strategy includes:

evaluating the transmission quality OSNR of the lightpath when all the spectrum resources on the link are occupied and the OSNR performance is the worst;

if OSNR satisfies the threshold for the current modulation format, establishing a lightpath and ending the allocation process; otherwise, calculating the bandwidth required by the lightpath service based on the bandwidth demand and the FEC overhead by using the modulation format subsequent to the current modulation format in the modulation format list, and repeating S5 and the steps thereafter until the lightpath service request is established; and after all the lightpath service requests have been successfully established, checking all the lightpath service requests in consideration of the nonlinear interference, recalculating the OSNR and determining whether it still satisfies the selected modulation format, and if it does not satisfy the current modulation format, blocking this service.

(2) Evaluating the OSNR quality by using the margin reservation strategy includes:

calculating the transmission quality OSNR of the lightpath based on the center frequency of the current spectrum resource on the fiber link;

reserving a margin M;

if (OSNR—M) satisfies the threshold for the current modulation format, establishing a lightpath and ending the allocation process, otherwise, calculating the bandwidth required by the lightpath service based on the bandwidth demand and the FEC overhead by using the modulation format subsequent to the current modulation format in the modulation format list, and repeating S5 and the steps thereafter until the lightpath service request is established; and after all the lightpath service requests have been successfully established, checking all the lightpath service requests in consideration of the nonlinear interference, recalculating the OSNR and determining whether it still satisfies the selected modulation format, and if it does not satisfy the current modulation format, blocking this service.

(3) Evaluating the OSNR quality by using the spectrum-dependent strategy includes:

calculating the transmission quality OSNR of the lightpath based on the center frequency of the current spectrum resource on the fiber link;

if the OSNR satisfies the threshold for the current modulation format, establishing a lightpath and ending the allocation process, otherwise, calculating the bandwidth required by the lightpath service based on the bandwidth demand and the FEC overhead by using the modulation format subsequent to the current modulation format in the modulation format list, and repeating S5 and the steps thereafter until the lightpath service request is established; and after all the lightpath service requests have been successfully established, checking all the lightpath service requests in consideration of the nonlinear interference, recalculating the OSNR and determining whether it still satisfies the current modulation format;

if the OSNR does not satisfy the current modulation format, releasing the spectrum resource used by all the lightpaths that have not been checked starting from the failed lightpath;

for the failed service request, lowering the level of the modulation format used and reallocating the spectrum along the same shortest path;

for the lightpath that has not been checked, reallocating the spectrum by using the modulation format that has been previously used and checking whether this lightpath satisfies the signal-to-noise ratio requirement; and repeating the process above until all the new lightpaths have been successfully established and all the lightpaths satisfy the signal-to-noise ratio requirement.

The present invention further discloses a system of OSNR-sensing spectrum allocation with optical channel performance guarantee, including an OSNR construction module, a shortest-path acquisition module, a modulation format sorting module, a spectrum allocation module and an OSNR quality evaluation module.

The OSNR construction module is configured to construct an OSNR evaluation model to evaluate the signal transmission quality of the lightpath, the OSNR evaluation model including amplified spontaneous emission noise, nonlinear interference and filter narrowing effect due to ROADM cascading.

The shortest-path acquisition module is configured to send a lightpath service request and acquiring the shortest path between the source node and the destination node.

The modulation format sorting module is configured to acquire a plurality of modulation formats and corresponding thresholds, sort the plurality of modulation formats according to their spectrum efficiencies in descending order, and acquire a list of the sorted modulation formats.

The spectrum allocation module is configured to calculate the bandwidth required by the lightpath service based on the bandwidth demand and FEC overhead by using the modulation format with the highest spectrum efficiency; substitute the bandwidth required by the lightpath service into the OSNR evaluation model and obtain the number of FS actually required by the service; and allocate the spectrum resource required by the current service to the shortest path by using the first-fit algorithm and acquire the center frequency of the current service on the lightpath.

The OSNR quality evaluation module is configured to evaluate the OSNR quality by using a full-spectrum loading strategy, a margin reservation strategy and a spectrum-dependent strategy respectively to guarantee the optimum optical channel performance after spectrum allocation.

Hereinafter, the technical solution of the present invention will be described in further detail in combination with a particular embodiment.

I. OSNR Evaluation Model

Figure 2:
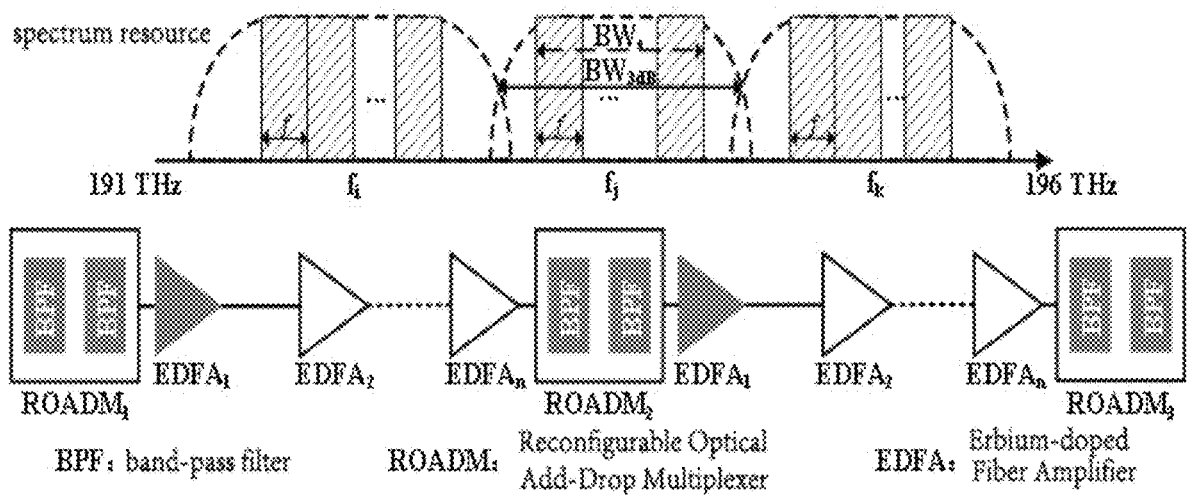
FIG. 2 is an exemplary diagram of the spectrum resource of the lightpath.

In the present invention, the signal transmission quality of lightpath is evaluated in terms of OSNR, including three aspects: amplified spontaneous emission noise (ASE), nonlinear interference (NLI) and filter narrowing effect due to ROADM cascading. When the signal in the lightpath passes through a ROADM, which means the signal will pass through two band-pass filters, the cascaded ROADM filters will cause the filter bandwidth to decrease. In the present invention, the passband of the whole filter is fitted to a high-order Gaussian function so as to abstract the shape of the passband of the cascaded filters. As shown in FIG. 2, if the signal bandwidth is $BW_s$, the 3 dB bandwidth of the filter is:

$$BW_{3dB} = BW_s \times \left[ \frac{T[dB]}{10 \times (-\ln 2) \times \log_{10}(e) \times N_f} \right]^{-\frac{1}{2n}}, \quad (1)$$

where T is the insertion loss of the filter in the unit of dB, $N_f$ is the number of cascaded filters, and n is the order of Gaussian function. Also, in order to allow the signals in the lightpath to have the same power, an optical amplifier such as an Erbium-doped Fiber Amplifier (EDFA) is needed in the present invention to enhance the optical signal, which introduces the ASE noise as shown in FIG. 2. Thereafter, the overall signal-to-noise ratio of the lightpath $OSNR_{lightpath}$ can be calculated as:

$$OSNR_{lightpath} = \frac{P_{in}}{P_{ASE} + P_{NLI}}, \quad (2)$$

where $P_{in}$ is the transmit power of the lightpath, $P_{ASE}$ is the power of the ASE noise, and $P_{NLI}$ is the power of NLI interference. In the present invention, assuming that each optical amplifier can exactly compensate for the loss of the previous signal, $P_{ASE}$ is calculated by the formula:

$$P_{ASE}=F \times h \times (G-1) \times f_i \times B_i \quad (3)$$

where F is the noise figure of the optical amplifier, h is the Planck constant, G is the gain of the optical amplifier, $f_i$ is the center frequency of the signal, and $B_i$ is the bandwidth of the signal.

For the nonlinear interference and assuming additive Gaussian noise, $P_{NLI}$ can be calculated as:

$$P_{NLI} = \eta \times P_{ch}^3 = \\ P_{ch}^3 \times \frac{4}{27} \times \frac{Y^2 L_{eff}^2 B_1}{\pi(a)^{-1}\beta_2 R_S^3} \sum_{n=1}^{N_{ch}} \left\{ asinh\left[\pi^2(\alpha)^{-1}\beta_2 B_i\left(f_n - f_i + \frac{B_n}{2}\right)\right] - asinh\left[\pi^2(\alpha)^{-1}\beta_2 B_i\left(f_n - f_i - \frac{B_n}{2}\right)\right]\right\} \quad (4)$$

where $$L_{eff}=(1-e^{-\alpha \cdot L_{span}})/\alpha \quad (5)$$

$$\gamma=2\pi \times n_2/(\lambda \times A_{eff}) \quad (6)$$

In the formula (4), "asinh" is the inverse hyperbolic sine function, α is the attenuation coefficient of the optical fiber in the unit of km$^{-1}$, $\beta_2$ is the second order fiber dispersion coefficient, $L_{span}$ is the span length, span meaning the physical link between two adjacent optical amplifiers, λ is the wavelength of the signal, $n_2$ is the nonlinear refractive index of the optical fiber, and $A_{eff}$ is the effective area of the optical fiber.

As can be seen from the formula above, the ASE noise is mainly related to the attenuation coefficient of the optical fiber and the NLI interference is mainly related to the effective area of the optical fiber.

II. OSNR-Sensing Spectrum Allocation

In the present invention, it is necessary to know the center wavelength and bandwidth of the lightpath in order to calculate the signal-to-noise ratio of the lightpath. Therefore, OSNR calculation is related to the spectrum allocation of each lightpath and different spectrum allocation algorithms result in different OSNR values. To this end, the routing and spectrum allocation process is to be introduced below in the present invention.

In contrast to prior algorithms, the signal-to-noise ratio estimation model proposed by the present invention has taken all the damage effects into account: ASE noise, NLI interference and bandwidth narrowing effect due to ROADM filter cascading. The latter two types of damages are related to the spectrum information on the link, so it is necessary to combine signal-to-noise ratio estimation with the spectrum allocation process. In contrast, traditional algorithms consider ASE noise as the damage with essential impact and that the spectrum allocated to the lightpath is irrelevant, which is defective.

The routing and spectrum allocation algorithm according to the present invention includes the following steps.

First step: inputting a network topology, a list of a series of lightpath service requests and a set of modulation formats.

Second step: for each request, running a shortest path algorithm to find routing between the requested source node and destination node.

Third step: first attempting the highest modulation format, the modulation format being PM-64QAM, PM-32QAM, PM-16QAM, PM-8QAM, PM-QPSK and PM-BPSK.

Table 1 shows the spectrum efficiencies and Forward Error Correction (FEC) limits of different modulation formats. It is noted that the FEC limit here is the OSNR threshold corresponding to the modulation format.

TABLE 1 spectrum efficiencies and FEC limits of different modulation formats

| modulation format | spectrum efficiency (bit/s/Hz) | FEC limit (dB) |
|---|---|---|
| PM-BPSK | 2 | 5.32 |
| PM-QPSK | 4 | 8.32 |
| PM-8QAM | 6 | 12.313 |
| PM-16QAM | 8 | 14.98 |
| PM-32QAM | 10 | 17.96 |
| PM-64QAM | 12 | 20.88 |

Based on the bandwidth demand and FEC overhead, the bandwidth required by the service is calculated as $BW_s=N_s \times f$, where f is the bandwidth of each flexible grid (FS) in the network and $N_s$ is the number of FS required by the service bandwidth.

Fourth step: in consideration of the impact of ROADM filter cascading on signal bandwidth narrowing, calculating the bandwidth required by the filter in the current lightpath by the formula (1), and then calculating the number of FS actually required by the service as $[BW_{3db}/f]$.

Fifth step: allocating the spectrum resource required by the current service to the shortest path by using the first fit strategy, which determines the center frequency of the current service on the lightpath.

Sixth step: evaluating the transmission quality OSNR of the lightpath, if the OSNR satisfies the threshold for the current modulation format, establishing a lightpath and ending the allocation process, otherwise proceeding to the third step and considering the subsequent modulation format in the list.

III. OSNR Performance Guarantee Strategy

The present invention considers an incremental service scenario where only one service request arrives at each time. When a new service request comes up, a new lightpath is set. If a certain lightpath that has been previously established successfully passes through the same link and node as the new lightpath, then the spectrum allocated to the new lightpath will have negative impact on its signal quality. This is mainly due to the Cross Channel Interference (XCI) between the lightpaths. Although Multi-channel Interference (MCI) also exists between the plurality of lightpaths, the impact of MCI will be neglected here in the present invention as MCI is much weaker than XCI. Meanwhile, the closer the center frequency of the spectrum for the other lightpath that shares the link or node is to the center frequency of the current lightpath, the greater the impact from XCI is caused. However, if a certain lightpath previously established does not pass through the same link or node as the new lightpath, spectrum allocation for the new lightpath will have no impact on the signal quality of this lightpath. Therefore, in order to establish a new lightpath successfully, in addition to ensuring that the signal-to-noise ratio of the new lightpath satisfies the threshold requirement, the present invention further needs to consider whether all the lightpaths previously established have been impacted and whether they still satisfy the set OSNR threshold. Therefore, the following three strategies are proposed by the present invention.

Full-spectrum loading strategy: assuming the case where all the links have the worst transmission quality, that is, the whole C band for optical signal transmission has been occupied, i.e., full-spectrum loading, all the existing XCI impacts have been considered in advance, which ensures that no additional XCI interference will be produced after establishment of the new lightpath.

Margin reservation strategy: starting from the first lightpath service request, first the signal-to-noise ratio of the established lightpath is calculated as $OSNR_{current}$ based on the current spectrum information on the optical fiber link. Considering the potential XCI effect of subsequent lightpath requests, an OSNR margin is reserved in selecting the modulation format for the current lightpath, that is, it is required that $OSNR_{current}$=M≥$FEC_{limit}$, where M is the set margin and $FEC_{limit}$ is the OSNR threshold required by the modulation format. The margin is determined through testing to ensure that all subsequent lightpath requests can be established successfully.

Spectrum-dependent strategy: This strategy is more advanced than the two strategies mentioned above at the cost of higher calculation complexity. In order to establish the new lightpath $LP_{new}$ successfully, first a spectrum resource is allocated to $LP_{new}$, then in the present invention, the list of lightpaths that have been successfully established {$LP_{pre}$} is checked to confirm whether the lightpaths in the list that share the link with $LP_{new}$ still satisfy their respective OSNR thresholds. If any lightpath fails, then in the present invention, starting from the failed lightpath, the spectrum resources used by all the lightpaths that have not been checked are released. Then, for the failed service request, in the present invention, the level of the modulation format used is lowered, and the spectrum is reallocated along the same route. For the lightpaths that have not been checked, the spectra are reallocated to them in the present invention by using the modulation format that has been previously used and it is checked to confirm whether they satisfy the signal-to-noise ratio requirement. In the present invention, this process is repeated until the new lightpath has been successfully established and all the lightpaths satisfy their signal-to-noise ratio requirements.

IV. Simulation and Performance Analysis

TABLE 2

| Optical fiber type | Effective area [$\mu m^2$] | Attenuation coefficient [dB/km] | Dispersion coefficient [ps/nm/km] |
| --- | --- | --- | --- |
| G.652 | 83 | 0.17-0.185 | 16.4 |
|  |  | 0.165 | 17 |
| G.654.E-A110 | 110 | 0.17-0.185 | 19.2 |
|  |  | 0.165 | 20.3 |
| G.654.E-A130 | 130 | 0.18-0.185 | 19.2 |
|  |  | 0.17-0.175 | 19.1 |
|  |  | 0.165 | 19.9 |

Figure 3:
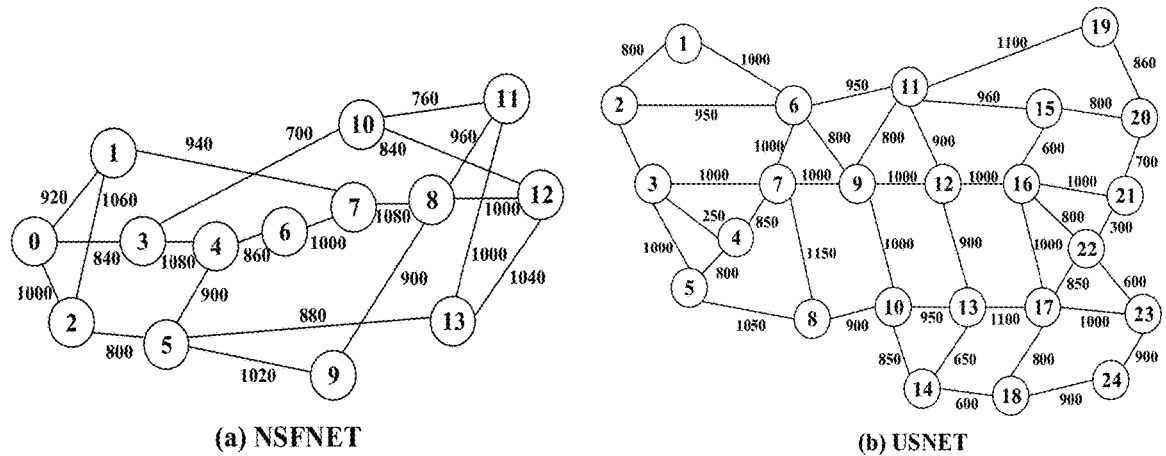
FIG. 3 is a test network diagram.

In the present invention, three different types of optical fibers are considered as shown in Table 2: G.652, G.654.E-A110 and G.654.E-A130. In an elastic optical network, to evaluate the performance of the three different types of OSNR guarantee strategies proposed and evaluate how the attenuation coefficient and the effective area of the optical fiber influence the service configuration and performance of the lightpath, an NSFNET network including 14 nodes and 21 links and a USNET network including 24 nodes and 43 links are utilized in the present invention as the test network of the present invention. In the specific test network as shown in FIG. 3, the distance of the link is defined in the unit of km. It is assumed here in the present invention that a service demand exists between each node pair, one demand being provided incrementally each time. The bandwidth demand for each service is evenly distributed in the range of [120, X]Gb/s, where X is the maximum bandwidth demand being set to 700 and 300 in the NSFNET network and the USNET network respectively. Assuming that the bandwidth of each FS is 12.5 GHz and the FEC overhead is 25%, with the margin reservation strategy, the margins of the NSFNET network and the USNET network are set respectively to 1.5 dB and 2 dB. The margin set for the USNET network is greater than the one set for the NSFNET network because the USNET network is larger and more complicated than the NSFNET network. Moreover, the EDFA noise figure is set to 5.5 dB and the transmit power of each lightpath is 0 dBm.

Figure 4:
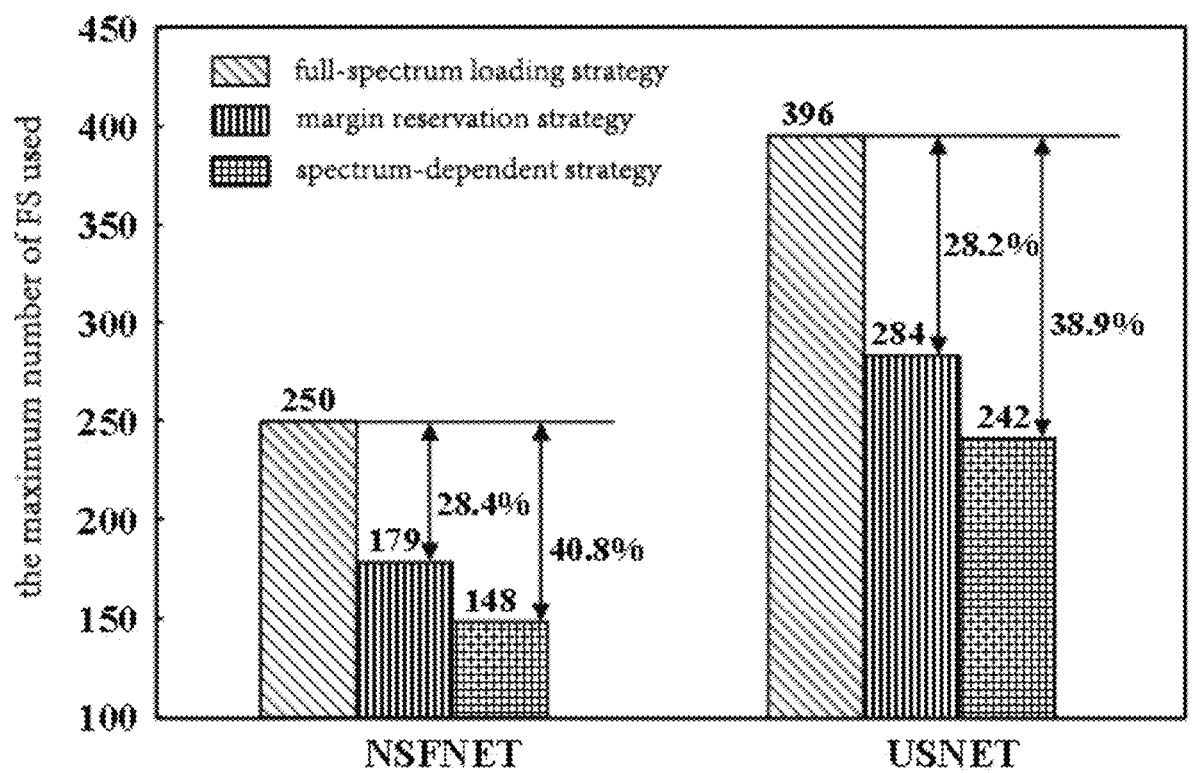
FIG. 4 is a diagram of performance comparison between OSNR performance guarantee strategies.

As shown in FIG. 4, in the present invention, firstly the performances of the three OSNR performance guarantee strategies are compared. The parameters of the optical fiber are set as follows: the attenuation coefficient is 0.185 dB/km and the effective area is 83 $\mu m^2$. As the full-spectrum loading strategy has taken the worst case of all the optical fiber links into account and the signal-to-noise ratio of each lightpath is underestimated, the allocated modulation format is of a lower level and more spectrum resources are needed. In contrast, the spectrum-dependent strategy only takes interference from the spectrum on the current lightpath into account, so the actual interference is lower than the result from the full-spectrum loading strategy and consequently higher signal-to-noise ratio can be calculated, thereby accomplishing more effective spectrum resource allocation with the least number of FS being used, less than the results from the full-spectrum loading strategy by 40.8% and 38.9% for NSFNET and USNET respectively. Although the margin reservation strategy also only takes the interference from the spectrum on the current lightpath into account, this strategy uses the same signal-to-noise ratio penalty for each of the lightpaths. As such, this strategy cannot sufficiently take the actual interference value of the current lightpath into account, and needs the intermediate number of FS, less than the full-spectrum loading strategy by 28.4% and 28.2% for these two networks respectively.

Figure 5:
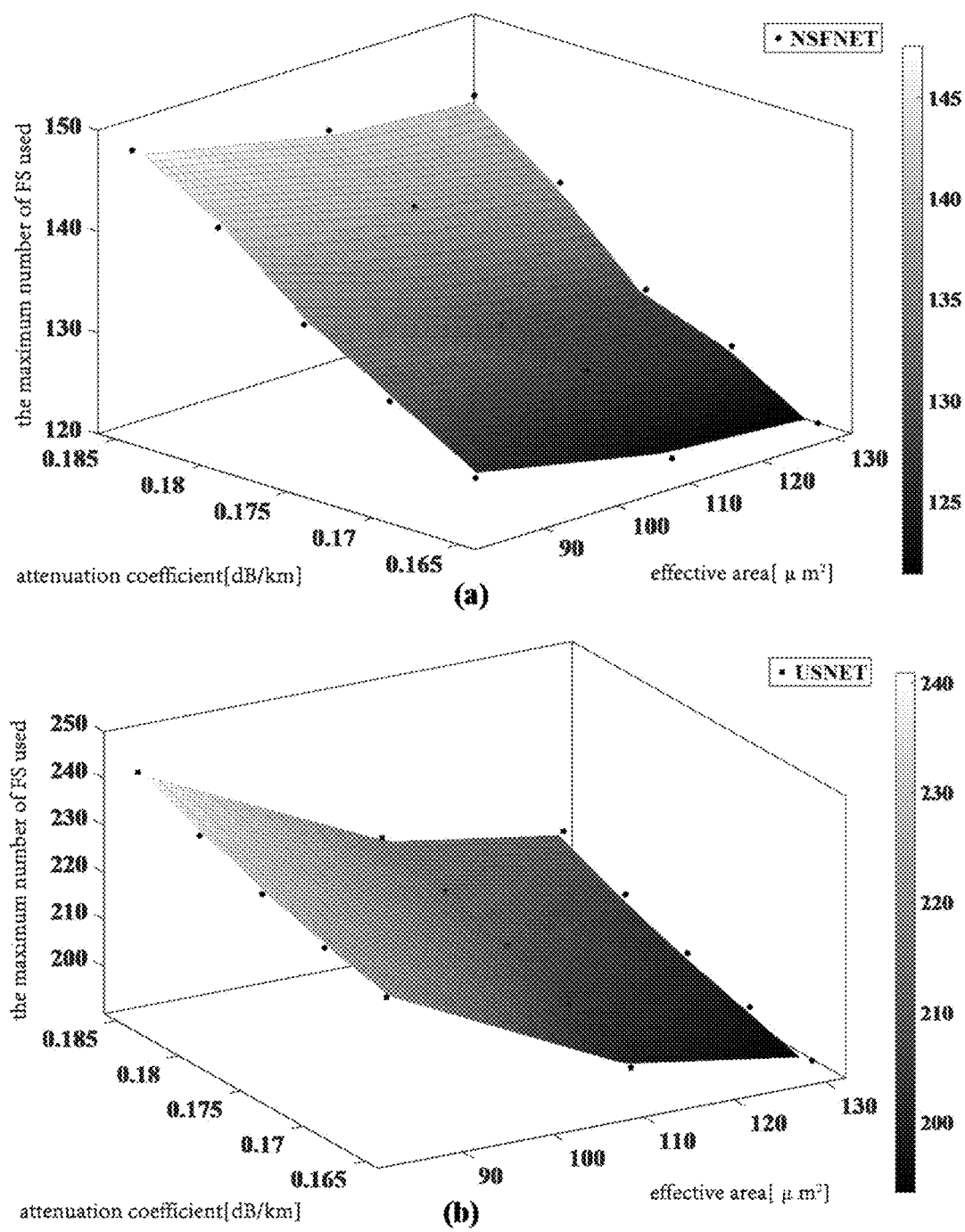
FIG. 5 is a diagram of performance comparison between different types of optical fibers, in which (a) shows NSFNET and (b) shows USNET.

Based on the spectrum-dependent strategy, as shown in FIG. 5, the present invention further evaluates the impacts of the loss and the effective area of the optical fiber on the configuration and performance of the lightpath. As can be seen, the number of FS used decreases as the loss of the optical fiber decreases and the effective area thereof increases, because the former can reduce the ASE noise while the latter can reduce the NLI interference. When the attenuation coefficient of the optical fiber decreases, it is found that the number of FS used decreases almost linearly, which is similar to the result for a point-to-point system, since this parameter mainly influences the gain of the amplifier and consequently the ASE noise and has little to do with the spectrum information on the lightpath in the network. In contrast, as the effective area increases, the number of FS used has the tendency of saturation, particularly from 110 $\mu m^2$ to 130 $\mu m^2$. There are mainly two causes: (1) there is a logarithmic relationship between the effective area and OSNR; (2) link spectrum not being fully loaded under spectrum-dependent strategy, so XCI improvement diminishes with increase of the effective area. This result is very useful for optical fiber fabrication, since from the perspective of network performance, this means that it is very important to fabricate an optical fiber of the lowest possible attenuation coefficient, but it is not necessary to increase the effective area once it exceeds 110 $\mu m^2$.

In summary, to evaluate the impacts of the loss and the effective area of the optical fiber on the service configuration of the lightpath in EON, the present invention proposes a signal-to-noise ratio calculation model to evaluate the signal quality of the lightpath. The present invention further proposes an OSNR sensing spectrum allocation algorithm and three lightpath allocation strategies with OSNR performance guarantee. Simulation results show that the spectrum-dependent ONSR performance guarantee strategy is the most effective and needs the least number of FS and can guarantee the ONSR demand of each lightpath. Researches find that although reducing the optical fiber loss can achieve good service performance, it is not necessary to fabricate an optical fiber of an effective area over 110 μm².

It should be understood by those skilled in the art that the embodiments of this application can be provided as a method, a system, or a computer program product. Therefore, this application can take the form of an entirely hardware embodiment, an entirely software embodiment or an embodiment combining software and hardware aspects. Furthermore, this application can take the form of a computer program product embodied on one or more computer usable storage media (including but not limited to disk memory, CD-ROM, optical memory, etc.) having computer usable program codes embodied therein.

This application is described with reference to flow charts and/or block diagrams of methods, devices (systems), and computer program products according to embodiments of this application. It should be understood that each flow and/or block in the flow charts and/or block diagrams, as well as combinations of flows and/or blocks in the flow charts and/or block diagrams can be implemented by computer program instructions. These computer program instructions can be provided to the processor of a general-purpose computer, a special-purpose computer, an embedded processor or other programmable data processing devices to produce a machine, so that the instructions executed by the processor of the computer or other programmable data processing devices produce means for implementing the functions specified in one or more flows in the flow chart and/or one or more blocks in the block diagram.

These computer program instructions can also be stored in a computer-readable memory that can guide a computer or other programmable data processing devices to operate in a specific way, so that the instructions stored in the computer-readable memory produce an article of manufacture including instruction means that implement the functions specified in one or more flows in the flow chart and/or one or more blocks in the block diagram.

These computer program instructions can also be loaded on a computer or other programmable data processing devices, so that a series of operation steps are executed on the computer or other programmable devices to generate computer-implemented processing, so that the instructions executed on the computer or other programmable devices provide steps for implementing the functions specified in one or more flows in the flow chart and/or one or more blocks in the block diagram.

Obviously, the embodiment described is only an example for clear explanation and not limitation of the implementation. For those of ordinary skill in the art, other changes or variations in different forms can be made on the basis of the above description. It is not necessary and impossible to exhaust all the implementations here. However, the obvious changes or variations derived therefrom are still within the scope of protection created by the present invention.

What is claimed is:

1. A method of OSNR-sensing spectrum allocation with optical channel performance guarantee, comprising the steps of:
    S1: constructing an OSNR evaluation model to evaluate signal transmission quality of a lightpath, the OSNR evaluation model including amplified spontaneous emission noise, nonlinear interference and filter narrowing effect due to ROADM cascading;
    S2: sending a lightpath service request and acquiring the shortest path between a source node and a destination node;
    S3: acquiring a plurality of modulation formats and corresponding thresholds, sorting the plurality of modulation formats according to their spectrum efficiencies in descending order, and obtaining a list of the sorted modulation formats;
    S4: calculating the bandwidth required by the lightpath service based on the bandwidth demand and FEC overhead by using the modulation format with the highest spectrum efficiency;
    S5: substituting the bandwidth required by the lightpath service into the OSNR evaluation model and obtaining the number of FS actually required by the service; and
    S6: allocating the spectrum resource required by the current service to the shortest path by using a first-fit algorithm, and obtaining the center frequency of the current service on the lightpath.

2. The method of OSNR-sensing spectrum allocation with optical channel performance guarantee of claim 1, wherein the method further comprises, after the step of allocating the spectrum resource required by the current service to the shortest path by using a first-fit algorithm and obtaining the center frequency of the current service on the lightpath:
    evaluating the OSNR quality by using a full-spectrum loading strategy, a margin reservation strategy and a spectrum-dependent strategy respectively to guarantee the optimum optical channel performance after spectrum allocation.

3. The method of OSNR-sensing spectrum allocation with optical channel performance guarantee of claim 2, wherein evaluating the OSNR quality by using the full-spectrum loading strategy comprises:
    evaluating the transmission quality of the lightpath when all the spectrum resources on the link are occupied and the OSNR performance is the worst;
    if the OSNR satisfies the threshold for the current modulation format, establishing a lightpath and ending the allocation process; otherwise, calculating the bandwidth required by the lightpath service based on the bandwidth demand and the FEC overhead by using the modulation format subsequent to the current modulation format in the modulation format list, and repeating S5 and the steps thereafter until the lightpath service request is established; and
    after all the lightpath service requests have been successfully established, checking all the lightpath service requests in consideration of the nonlinear interference, recalculating the OSNR and determining whether it still satisfies the selected modulation format, and if it does not satisfy the current modulation format, blocking this service.

4. The method of OSNR-sensing spectrum allocation with optical channel performance guarantee of claim 2, wherein evaluating the OSNR quality by using the margin reservation strategy comprises:

calculating the transmission quality OSNR of the lightpath based on the center frequency of the current spectrum resource on the fiber link;
reserving a margin M;
if (OSNR−M) satisfies the threshold for the current modulation format, establishing a lightpath and ending the spectrum allocation process, otherwise, calculating the bandwidth required by the lightpath service based on the bandwidth demand and the FEC overhead by using the modulation format subsequent to the current modulation format in the modulation format list, and repeating S5 and the steps thereafter until the lightpath service request is established; and
after all the lightpath service requests have been successfully established, checking all the lightpath service requests in consideration of the nonlinear interference, recalculating the OSNR and determining whether it still satisfies the selected modulation format, and if it does not satisfy the current modulation format, blocking this service.

5. The method of OSNR-sensing spectrum allocation with optical channel performance guarantee of claim 2, wherein evaluating the OSNR quality by using the spectrum-dependent strategy comprises:
calculating the transmission quality OSNR of the lightpath based on the center frequency of the current spectrum resource on the fiber link;
if the OSNR satisfies the threshold for the current modulation format, establishing a lightpath and ending the allocation process; otherwise, calculating the bandwidth required by the lightpath service based on the bandwidth demand and the FEC overhead by using the modulation format subsequent to the current modulation format in the modulation format list, and repeating S5 and the steps thereafter until the lightpath service request is established; and
after all the lightpath service requests have been successfully established, checking all the lightpath service requests in consideration of the nonlinear interference, recalculating the OSNR and determining whether it still satisfies the current modulation format;
if the OSNR does not satisfy the current modulation format, releasing the spectrum resource used by all the lightpaths that have not been checked starting from the failed lightpath; and
for the failed service request, lowering the level of the modulation format used and reallocating the spectrum along the same shortest path.

6. The method of OSNR-sensing spectrum allocation with optical channel performance guarantee of claim 5, wherein the method further comprises, after the step of, for the failed service request, lowering the level of the modulation format used and reallocating the spectrum along the same shortest path:
for a lightpath that has not been checked, reallocating the spectrum by using the modulation format that has been previously used and checking whether this lightpath satisfies the signal-to-noise ratio requirement; and
repeating the process above until all the new lightpaths have been successfully established and all the lightpaths satisfy the signal-to-noise ratio requirement.

7. The method of OSNR-sensing spectrum allocation with optical channel performance guarantee of claim 1, wherein the step S1 comprises:
when the signal bandwidth is $BW_s$, the 3 dB bandwidth of the filter is:

$$BW_{3dB} = BW_s \times \left[ \frac{T[\text{dB}]}{10 \times (-\ln 2) \times \log_{10}(e) \times N_f} \right]^{-\frac{1}{2n}}, \quad (1)$$

where T is the insertion loss of the filter in the unit of dB, $N_f$ is the number of cascaded filters, and n is the order of Gaussian function;
the overall signal-to-noise ratio of the lightpath $OSNR_{lightpath}$ is $$OSNR_{lightpath} = \frac{P_{in}}{P_{ASE} + P_{NLI}}, \quad (2)$$

where $P_{in}$ is the transmit power of the lightpath, $P_{ASE}$ is the power of the ASE noise, and $P_{NLI}$ is the power of NLI interference;
in the case where each optical amplifier can exactly compensate for the loss of the previous signal, $P_{ASE}$ is calculated by the formula:

$$P_{ASE} = F \times h \times (G-1) \times f_i \times N_i \quad (3)$$

where F is the noise figure of the optical amplifier, h is the Planck constant, G is the gain of the optical amplifier, $f_i$ is the center frequency of the signal, and $B_i$ is the bandwidth of the signal;
for the nonlinear interference and assuming additive Gaussian noise, $P_{NLI}$ can be calculated as:

$$P_{NLI} = \eta \times P_{ch}^3 = \quad (4)$$
$$P_{ch}^3 \times \frac{4}{27} \times \frac{Y^2 L_{eff}^2 B_1}{\pi(\alpha)^{-1} \beta_2 R_S^3} \sum_{n=1}^{N_{ch}} \left\{ \text{asinh}\left[ \pi^2(\alpha)^{-1} \beta_2 B_i \left( f_n - f_i + \frac{B_n}{2} \right) \right] - \text{asinh}\left[ \pi^2(\alpha)^{-1} \beta_2 B_i \left( f_n - f_i - \frac{B_n}{2} \right) \right] \right\}$$

where $L_{eff} = (1 - e^{-\alpha \cdot L_{span}})/\alpha$, $Y = 2\pi \times n_2/(\lambda \times A_{eff})$, "asinh" is the inverse hyperbolic sine function, α is the attenuation coefficient of the optical fiber, $\beta_2$ is the second order fiber dispersion coefficient, $L_{span}$ is the span length, span meaning the physical link between two adjacent optical amplifiers, λ is the wavelength of the signal, $n_2$ is the nonlinear refractive index of the optical fiber, and $A_{eff}$ is the effective area of the optical fiber.

8. The method of OSNR-sensing spectrum allocation with optical channel performance guarantee of claim 1, wherein the plurality of modulation formats in the step S3 comprises: PM-64QAM, PM-32QAM, PM-16QAM, PM-8QAM, PM-QPSK and PM-BPSK.

9. A system of OSNR-sensing spectrum allocation with optical channel performance guarantee, comprising:
an OSNR construction module configured to construct an OSNR evaluation model to evaluate the signal transmission quality of the lightpath, the OSNR evaluation model including amplified spontaneous emission noise, nonlinear interference and filter narrowing effect due to ROADM cascading;
a shortest-path acquisition module configured to send a lightpath service request and acquire the shortest path between a source node and a destination node;
a modulation format sorting module configured to acquire a plurality of modulation formats and corresponding thresholds, sort the plurality of modulation formats according to their spectrum efficiencies in descending order, and acquire a list of the sorted modulation formats; and a spectrum allocation module configured to calculate the bandwidth required by the lightpath service based on the bandwidth demand and FEC overhead by using the modulation format with the highest spectrum efficiency; substitute the bandwidth required by the lightpath service into the OSNR evaluation model and obtain the number of FS actually required by the service; and allocate the spectrum resource required by the current service to the shortest path by using a first-fit algorithm and acquire the center frequency of the current service on the lightpath.

10. The system of OSNR-sensing spectrum allocation with optical channel performance guarantee of claim 9, wherein the system further comprises:

an OSNR quality evaluation module configured to evaluate the OSNR quality by using a full-spectrum loading strategy, a margin reservation strategy and a spectrum-dependent strategy respectively to guarantee the optimum optical channel performance after spectrum allocation.

* * * * *